Figure 1:
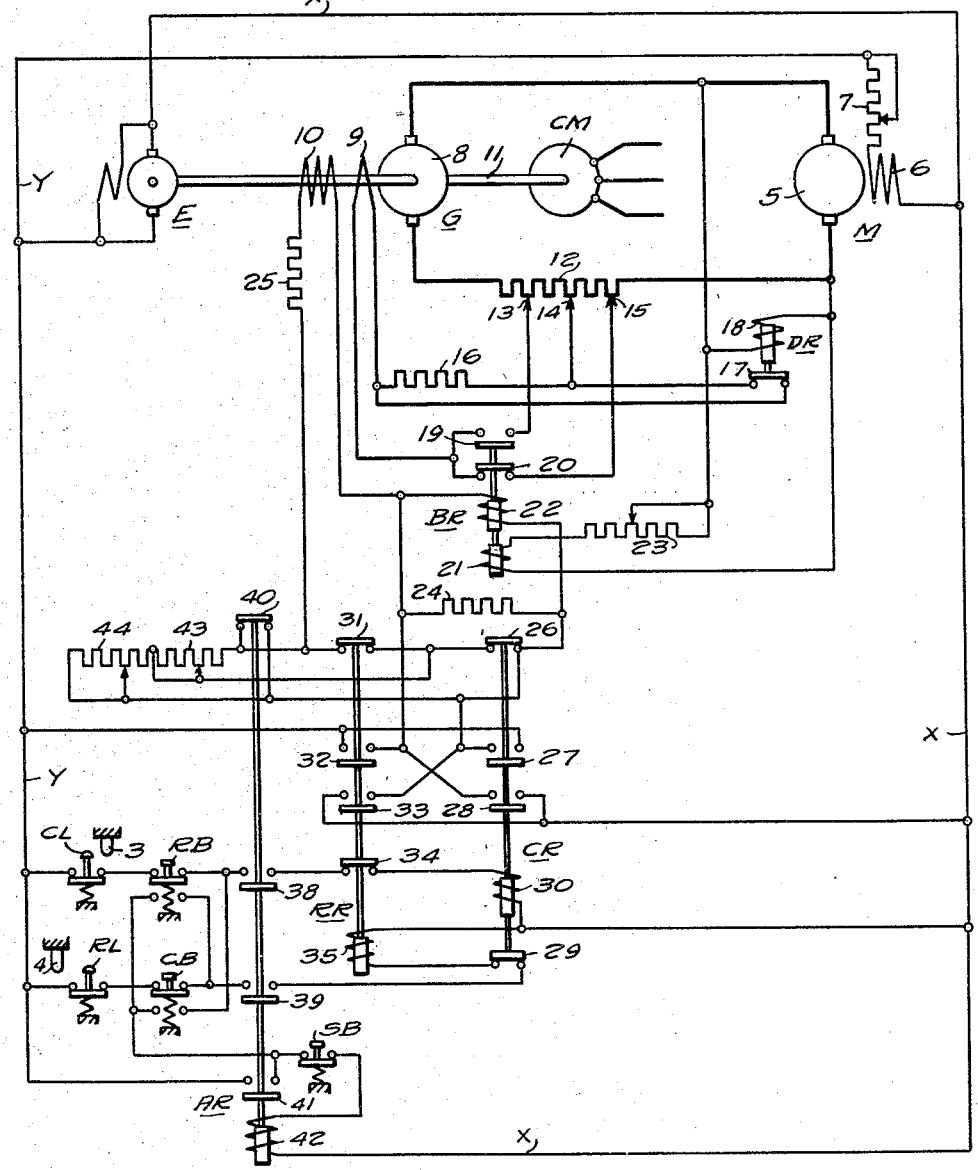

Feb. 17, 1948.  G. E. KING  2,436,308
CONTROLLER
Filed Oct. 19, 1945

WITNESSES:

INVENTOR
George E. King.
BY
Paul E. Friedemann
ATTORNEY

Patented Feb. 17, 1948

2,436,308

UNITED STATES PATENT OFFICE 2,436,308

CONTROLLER

George E. King, Swissvale, Pa., assignor to Westinghouse Electric Corporation, East Pittsburgh, Pa., a corporation of Pennsylvania Application October 19, 1945, Serial No. 623,371

8 Claims. (Cl. 318—140)

My invention relates to electric drives for planers or other machines which operate with reciprocating or reversing motion and are capable of performing automatically a series of successive advance and return strokes.

It is a general object of my invention to devise a drive that permits a speed adjustment over a relatively wide range, such as of eight to one, and lends itself especially well to performing a large number of short strokes. A performance in accordance with this general object can be obtained by designing the drive as a variable voltage system whose generator is controlled by an additional auxiliary dynamo of the amplifying type, but such systems, for economical reasons, are not well suited for smaller machines where the cost of additional dynamo equipment is apt to be in disproportion to that of the machine proper. It, therefore, is a more specific object of my invention to achieve the desired performance with relatively simple and inexpensive means as compared with the just-mentioned systems so that the drive is not economically limited to large machines.

As will be described hereinafter, the invention involves a variable voltage drive whose generator has a separately excited shunt type field winding, and provides self-excitation by means of a series type field winding energized from the armature circuit in dependence upon the load current of the drive motor. Hence, the generator of the drive system is comparable to machines of the compound connected type. As a rule, such a compound type generator in variable voltage drives afford a good speed regulation over a range of about eight to one, but the required amount of compounding is apt to be detrimental during the reversing run of the motor. On acceleration, and during the forward and return strokes, the generator series field, in compound type connection, is cumulative with the separately excited field and of sufficient strength to increase the generator voltage an amount corresponding substantially to the IR drop of the generator and motor armatures, this IR drop being at full load an appreciable amount, for instance about 9%, of the maximum generator voltage. At the end of the stroke, during the regenerative braking portion of the reversing cycle, the motor acts as a generator thus reversing the direction of current flow through the generator armature and the generator series field. Under this condition, the series field acts differentially relative to the separately excited field and tends to force the generator voltage down rapidly. This causes a heavy armature current to flow which results in excessive sparking and burning of the armature brushes. If one attempts to reduce this detrimental effect by reducing the amount of self-excitation, passable commutation can be obtained only on account of a deterioration in speed regulation. If damping coils or short-circuited windings are used in the generator, the obtainable improvement in commutation entails the disadvantage that, in order to be effective, the damping coils have to be large and hence reduce the winding space available for the useful field windings of the generator.

It is, therefore, another object of my invention to provide a variable voltage drive which, while securing optimum speed-regulating qualities of a compound-type generator connection, avoids or considerably reduces the just-mentioned detrimental effects on commutation or available winding space.

In order to achieve these objects, and in accordance with one of the features of my invention, I provide a reversible variable voltage drive with means which control the field circuits of the appertaining variable voltage generator in such a manner that its load-responsive field winding, corresponding generally to the series field winding of a compounded machine, is substantially always energized in cumulative relation to the appertaining separately excited or main control field winding. According to a more specific feature of the invention, I provide contact means which reverse the polarity of connection of the load-responsive field winding during the regenerative periods of the motor.

Figure 2:
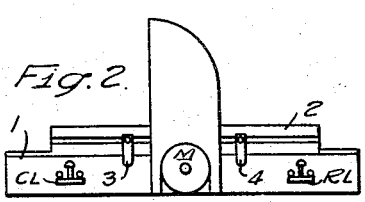

These and other objects and features of my invention will be apparent from the drawing, in which:

Fig. 1 represents the circuit diagram of a planer drive according to my invention, while Fig. 2 is a schematic illustration of a planer showing some of the electric elements of the circuit diagram.

According to Fig. 2, the bed structure 1 of the planer carries a reciprocable platen 2 which is driven by a reversible electric motor M and provided with two adjustable dogs 3 and 4 for actuating a cut limit switch CL and a return limit switch RL serving to control the reversing operation of the drive motor M in the manner explained hereinafter with reference to the circuit diagram of Fig. 1.

As shown in Fig. 1, the drive motor M has its armature 5 acted upon by a field winding 6 which is separately excited through an adjusting rheostat 7 from direct-current mains X and Y. The mains are energized by substantially constant voltage from a suitable source of direct current here consisting of an exciter generator E.

The armature 5 of the drive motor M is energized by variable direct-current voltage generated in the armature 8 of a generator G under joint control by two field windings 9 and 10. The generator armature 8 is mounted on a shaft 11 which drives also the exciter E and is operated by a constant speed motor CM. The armature circuit of motor M and generator G includes a current measuring rheostat 12 with three adjustable taps or sliders denoted by 13, 14, and 15, respectively. The generator field winding 9 has one of its terminals connected to the intermediately located tap 14 in series with a resistor 16. This resistor has a short-circuit path under control by the contact 17 of a relay DR whose control coil 18 is connected across the armature terminals of motor M. The other terminal of field winding 9 is connected to the contacts 19 and 20 of a relay BR which is provided with two control coils 21 and 22. This relay is of special design and operation and will be more fully described in a later place. When contact 20 is closed, as shown in Fig. 1, field winding 9 is connected across taps 14 and 15 of resistor 12; and when contact 19 is closed, field winding 9 is connected across taps 13 and 14. In either condition of relay BR, the winding 9 is energized by a voltage drop across part of resistor 12 which voltage varies in proportion to the load current of the motor M. Hence, the control effected by field winding 9 is responsive to the motor load current, but the polarity of this control depends on the contact condition of relay BR.

Control coil 21 of relay BR is connected in parallel to coil 18 of relay DR and hence energized in dependence upon the voltage imposed on the drive motor by the generator G. A rheostat 23 is inserted in the circuit of relay coil 21 in order to adjust or calibrate its response to the load voltage. Relay coil 22, in parallel with a resistor 24, is connected in the circuit of generator field winding 10. This circuit includes also a series resistor 25 for adjusting or calibrating purposes and is energized from the above-mentioned constant voltage mains X and Y under control by two reversing relays CR and RR, respectively, both being, in turn, controlled by a control relay AR.

The relay CR serves to control the excitation of generator field winding 10 with such a polarity as to cause the motor M to run the planer platen in the cutting direction, while the relay RR performs the control required for causing the motor to run the platen in the return direction. Relay CR has four contacts 26, 27, 28, and 29 controlled by a coil 30; and relay RR has likewise four contacts 31, 32, 33 and 34 controlled by a coil 35. The circuit of coil 30 extends between mains X and Y through contact 34 of the return relay RR and includes a contact 38 of the control relay AR, a return control switch RB preferably of the push-button type, and the above-mentioned cut limit switch CL. The circuit of coil 35 appertaining to the return relay RR extends between mains X and Y through contact 29 of relay CR and includes a contact 39 of control relay AR. The latter circuit is associated with a cut control switch CB preferably of the push-button type and includes also the above-mentioned return limit switch RL. The contacts RB and CB are cross-connected and have each a normally open contact attached to a stop switch SB which is preferably also designed as a push button. The control relay AR is provided with two further contacts denoted by 40 and 41 and has a control coil 42 connected between mains X and Y in series with the stop switch SB and under control by two normally open contacts of switches RB and CB, respectively. Contact 40 of relay AR controls a circuit which contains two adjustable rheostats 43 and 44. Rheostat 43 permits adjusting the excitation of generator-field winding 10 that is effective during the return stroke of the planer, while rheostat 44 serves to adjust the excitation of field winding 10 effective during the cutting stroke.

Before explaining the operation of the control system, a further description of the relay BR and its performance appears necessary. Relay BR is a double throw contactor. Its coil 22 may be designed as a top coil, and its coil 21 as a bottom coil. When the top coil 22 is fully energized, the top contact 19 will close and remain closed even though the bottom coil 21 is thereafter energized. Conversely, if the bottom coil 21 is fully energized and the bottom contact 20 closed, this contact will remain closed even though the top coil 22 is thereafter energized. When both coils are deenergized, as is assumed in the illustration, the bottom contact 20 is closed due to the armature bias of the relay caused by gravity and/or a kick-out spring. Assuming the top coil to be energized and to close the top contact 19 previous to a full energization of the bottom coil 21, the top contact will stay closed as long as the energization of the top coil is maintained. Any interruption in the energization of the top coil will have the effect of opening the top contact and closing the bottom contact 20 due to the armature bias and the simultaneous pull of the energized bottom coil 21, and a subsequent re-energization of the top coil 22 will then fail to re-open the contact 20. Assuming that thereafter the energization of the bottom coil 21 is gradually reduced, a condition will be reached where the combined pull of bottom coil and armature bias is overpowered by the pull of the top coil 22. Then the contactor will transfer from one to the other position at a very high speed. As explained above, such a rapid transfer has the effect of reversing the polarity of field winding 9 in generator G. Under normal operating conditions, the top contact 19 of relay BR is closed, and the field winding 9 is so connected that its field is cumulative relative to the field of winding 10.

The system as a whole operates in the following manner. When the motor CM runs at normal speed, the exciter E supplies constant voltage to mains X and Y and to the motor field winding 6, and the generator G is in operative condition although its armature provides no voltage as long as the generator field windings 9 and 10 remain deenergized. When switch CB is actuated by the operator in order to start the motor and platen in the cutting direction, coil 42 of relay AR becomes energized in the circuit Y, CL, RB, CB, SB 42, X. Relay AR picks up and closes at contact 41 a self-holding circuit for coil 42, so that relay AR remains in pick-up condition when thereafter the switch RB is released by the operator. Thereafter, the relay AR drops out only when the operator depresses the stop switch SB. The closing of contacts 38 and 39 in relay AR completes for relay CR the coil circuit X, 30, 34, 38, RB, CL, Y. Relay RR remains deenergized because its coil circuit is first opened at switch CB and becomes interrupted at contact 29 immediately upon response of relay CR. Contacts 27 and 28 of relay CR apply voltage to the field winding 9 of generator G in the direction required to generate voltage for motor M of the polarity which corresponds to the cutting direction of the platen. This voltage is determined by the selected setting of the cutting rheostat 44 which is now connected in the circuit of field winding 10 due to the opening of contacts 26 and 40. Top coil 22 of relay BR becomes energized in accordance with the excitation of the generator field winding 10. Consequently, top contact 19 closes, and bottom contact 20 opens. The current responsive field winding 9 of generator G is now energized in a cumulative sense relative to the field of winding 10. As a result, the voltage generated in armature 8 builds up to the value preset by rheostat 44. The planer motor M accelerates and runs in the cutting direction until the cut limit dog 3 opens the cut limit switch CL. Then the cut relay CR drops out and deenergizes the field winding 9 of generator G as well as the top coil 22 of relay BR. Bottom contact 20 closes and reverses the polarity of connection of field winding 9 relative to the potentiometric rheostat 12. The generator voltage decreases, and the planer motor regenerates through the generator armature 8. Since field winding 9 has been reversed, the regenerative current now passing through this field winding tends to maintain the generator voltage. This action limits the rate of decline of the generator voltage and hence also the regenerative braking current originating in the armature 5 of motor M, because the higher the braking current tends to rise, the slower will be the rate of change in generator voltage. In the meantime, the return relay RR picks up due to the energization of its coil 35 in the circuit X, 35, 29, 39, CB, RL, Y. As a result, coil 22 of relay BR is energized, and generator field winding 9 becomes excited with reversed polarity through the return rheostat 43 and contacts 32, 33 of relay RR. As the generator voltage further decreases, the excitation of top coil 22 will reach a value where it overpowers the declining effect of bottom coil 21 so that contact 19 opens and contact 20 closes, thus reversing the polarity of winding 9 in order to set the system for the return stroke of the platen. During the major portion of the return stroke, the field winding 9 operates again in cumulative relation to field winding 10. In other words, the reversal of field winding 9 is timed so that it coincides approximately with the period of regenerative braking current. Upon completion of the return stroke, the return limit dog 4 opens the limit switch RL so that relay RR drops out and, at contact 34, closes the circuit of coil 30. Coil CR picks up and prepares the system for the next cutting stroke, the relay BR being again effective during the regenerative period to maintain the field windings 9 and 10 substantially in cumulative relation to each other. This performance is repeated during the subsequent return and cutting strokes.

When the push-button switch RB is actuated first, the performance of the system is the same as described above except that the motor starts with a return stroke.

The adjustable taps 13, 14 and 15 of rheostat 12 make it possible to adjust the field strength of winding 9 independently for both running and braking in order to obtain the value of compounding best suited for good regulation and also for limiting the braking current to a safe value.

It is known that direct-current machines will commutate more current at low voltages than at their maximum operating voltage. Advantage of this feature can be taken by selecting a coil 21 for contactor BR that will release at the maximum safe value. The resistor 23 inserted in series with the bottom coil can be adjusted for best operation.

In the off condition of the system both coils of relay BR are deenergized. The bottom contact 20 is closed and the field of generator winding 9 has then the effect of killing the residual voltage of the generator. Relay DR, when deenergized, short circuits the resistor 16 in series with the field winding 9 to increase the drop across this field winding and thus reduce the residual voltage of the generator to prevent the planer motor from creeping. The relay DR is adjusted to drop out at some voltage less than the minimum operating voltage of the generator.

The generator field discharge resistor 16 is connected so that it is effective in the reversing cycle during the transition time between the dropping out of one directional relay CR or RR and the closing of the other. The circuit is arranged so that the directional rheostat 43 or 44 effective at a time is in series with the discharge resistor 16 while the directional relay RR or CR is opening. This results in a higher effective value of discharge resistance at low speeds. At high speed, the directional rheostats are out. This tends to slow down the initial rate of change of generator voltage at high speeds and voltages while it becomes less effective as the speed and voltage are reduced.

A drive system as described above provides the following advantages:

1. The current-responsive or self-excited generator field can be adjusted to give good regulation.
2. The braking current is limited by virtue of the same current-responsive field.
3. The separately excited generator field can be designed to be fast for rapid acceleration.
4. The system can be adjusted to provide a large number of short strokes with good commutation.

It will be obvious to those skilled in the art that drive systems according to my invention can be modified in various respects and details without departing from the spirit and principles of my invention and within the scope of its essential features as set forth in the claims attached hereto.

I claim as my invention:

1. A variable voltage drive, comprising a drive motor, a generator having an armature circuit connected to said motor for providing variable voltage therefor and two field windings for controlling said voltage, means connected to one of said field windings for providing separate excitation therefor, resistance means connected in said armature circuit for providing energizing voltage for said other field winding in accordance with the current in said circuit and having three spaced tap points of which the intermediate one is connected to one end of said other field winding, relay means disposed for selectively connecting said other two tap points to the other end of said other field winding, and control means connected with said relay means for causing said relay means to change the connection of said other winding end to thereby reverse the polarity of said other field winding during regenerative periods of said motor so that said field windings have cumulative fields during motoring and regenerative periods of said motor.

2. A variable voltage drive, comprising a drive motor, a generator having an armature circuit connected to said motor for providing variable voltage therefor and having a separately excited field winding and a current-responsive field winding for cumulatively controlling said voltage, current measuring impedance means disposed in said armature circuit and connected with said current-responsive field winding to control the excitation of the latter, reversing means interposed between said impedance means and said current-responsive field winding for reversing the polarity of the latter, said impedance means having sections of unequal impedance value connected with said reversing means so that the degree of excitation of said current-responsive field winding changes together with a reversal in polarity, and means for controlling said reversing means to operate during regenerative periods of the motor so that said field winding remains cumulative during a substantial portion of said periods.

3. A variable voltage drive, comprising a drive motor, a generator having an armature circuit connected to said motor for providing variable voltage therefor and having a separately excited field winding and a current-responsive field winding for jointly controlling said voltage, a control circuit connected to said separately excited field winding for controlling its excitation, current measuring impedance means disposed in said armature circuit and connected with said current-responsive field winding to control the excitation of the latter, a double-throw contactor having movable contacts interposed between said current-responsive field winding and said impedance means for reversing the polarity of connection of said latter field winding relative to said impedance means and being biased toward a contact position in which said two field windings act cumulatively under motoring conditions of said motor, said contactor having two differentially acting control coils for moving said contacts in opposite directions respectively, each coil being rated for retaining when fully energized said contacts in the appertaining position against the action of the other coil when the latter is subsequently energized, the coil for moving said contacts in their bias direction being connected with said control circuit to be energized in dependence upon the excitation of said separately excited field winding, and the other coil being connected across said armature circuit to be energized in dependence upon the voltage conditions of said circuit, whereby said contactor is caused to temporarily reverse said polarity during regenerative periods of said motor in order to maintain said field windings in cumulative condition substantially during said periods.

4. A variable voltage drive, comprising a drive motor, a generator having an armature circuit connected to said motor for providing variable voltage therefor and having a separately excited field winding and a current-responsive field winding for jointly controlling said voltage, a control circuit having reversing contactors connected to said separately excited field winding for reversing the polarity of its excitation in order to cause said motor to reverse its running direction, current measuring impedance means disposed in said armature circuit and connected with said current-responsive field winding to control the excitation of the latter, a double-throw contactor having movable contacts interposed between said current-responsive field winding and said impedance means for reversing the polarity of connection of said latter field winding relative to said impedance means and being biased toward a contact position in which said two field windings act cumulatively under motoring conditions of said motor, said contactor having two differentially acting control coils for moving said contacts in opposite directions respectively, each coil being rated for retaining when fully energized said contacts in the appertaining position against the action of the other coil when the latter is subsequently energized, the coil for moving said contacts in their bias direction being connected with said control circuit to be energized in dependence upon the excitation, and polarity of said separately excited field winding, and the other coil being connected across said armature circuit to be energized in dependence upon the voltage conditions of said circuit, whereby said contactor is caused to temporarily reverse said polarity during the regenerative periods of said motor incident to the reversals of its running direction so that said field windings act cumulatively also during a substantial portion of said regenerative periods.

5. A variable voltage drive, comprising a drive motor, a generator having an armature circuit connected to said motor for providing variable voltage therefor and having a separately excited field winding and a current-responsive field winding for jointly controlling said voltage, a control circuit connected to said saparately excited field winding for controlling its excitation and having reversing contactors for controlling the polarity of said excitation, two limit control means operable at the end of travel of said motor in each of its running directions and connected with said contactors for controlling them to reverse the polarity of said excitation when said motor reaches the end of its travel in either running direction, current measuring impedance means disposed in said armature circuit and connected with said current-responsive field winding to control the excitation of the latter, a double-throw contactor having movable contacts interposed between said current-responsive field winding and said impedance means for reversing the polarity of connection of said latter field winding relative to said impedance means and being biased toward a contact position in which said two field windings act cumulatively under motoring conditions of said motor, said contactor having two differentially acting control coils for moving said contacts in opposite directions respectively, each coil being rated for retaining when fully energized said contacts in the appertaining position against the action of the other coil when the latter is subsequently energized, the coil for moving said contacts in their bias direction being connected with said control circuit to be energized in dependence upon the excitation, and polarity of said separately excited field winding, and the other coil being connected across said armature circuit to be energized in dependence upon the voltage conditions of said circuit, whereby said contactor is caused to temporarily reverse said polarity during the regenerative periods of said motor incident to the reversals of its running direction so that said field windings act cumulatively also during a substantial portion of said regenerative periods.

6. A variable voltage drive, comprising a drive motor, a generator having an armature circuit connected to said motor for providing variable voltage therefor and having a separately excited field winding and a current-responsive field winding for jointly controlling said voltage, a control circuit connected to said separately excited field winding for controlling its excitation and having reversing contactors for controlling the polarity of said excitation, two limit control means operable at the end of travel of said motor in each of its running directions and connected with said contactors for controlling them to reverse the polarity of said excitation when said motor reaches the end of its travel in either running direction, current measuring impedance means disposed in said armature circuit and connected with said current-responsive field winding to control the excitation of the latter, and condition-responsive control means interposed between said resistance means and said current-responsive field winding for reversing the polarity of connection of said latter winding during braking periods of said motor incident to the reversal of running direction caused by said contactors under control by said limit control means.

7. A variable voltage drive for reciprocating the platen of planers, comprising a platen drive motor, a generator having an armature circuit connected to said motor for providing variable voltage therefor and having a separately excited field winding and a current-responsive field winding for jointly controlling said voltage, a control circuit connected to said separately excited field winding for controlling its excitation and having reversing contactors for selectively controlling the polarity of said excitation so as to determine the running direction of said motor, two limit contacts operable by the platen at the respective ends of its reciprocating travel and connected with said contactors for controlling them to reverse said motor, current measuring impedance means disposed in said armature circuit and connected with said current-responsive field winding to control the excitation of the latter, and condition-responsive control means interposed between said resistance means and said current-responsive field winding for reversing the polarity of connection of said latter winding during braking periods of said motor incident to the reversal of running direction caused by said contactors so that said field windings act cumulatively also during a substantial portion of said braking periods.

8. A variable voltage drive for reciprocating the platen of planers, comprising a platen drive motor, a generator having an armature circuit connected to said motor for providing variable voltage therefor and having a separately excited field winding and a current-responsive field winding for jointly controlling said voltage, a control circuit connected to said separately excited field winding for controlling its excitation and having reversing contactors for selectively controlling the polarity of said excitation so as to determine the running direction of said motor, two limit contacts operable by the platen at the respective ends of its reciprocating travel and connected with said contactors for controlling them to reverse said motor, current measuring impedance means disposed in said armature circuit and connected with said current-responsive field winding to control the excitation of the latter, a double-throw contactor having movable contacts interposed between said current-responsive field winding and said impedance means for reversing the polarity of connection of said latter field winding relative to said impedance means and being biased toward a contact position in which said two field windings act cumulatively under motoring conditions of said motor, said contactor having two differentially acting control coils for moving said contacts in opposite directions respectively, each coil being rated for retaining when fully energized said contacts in the appertaining position against the action of the other coil when the latter is subsequently energized, the coil for moving said contacts in their bias direction being connected with said control circuit to be energized in dependence upon the excitation of said separately excited field winding, and the other coil being connected across said armature circuit to be energized in dependence upon the voltage conditions of said circuit, whereby said contactor is caused to temporarily reverse said polarity during regenerative periods of said motor in order to maintain said field windings in cumulative condition substantially during said periods.

GEORGE E. KING.

REFERENCES CITED

The following references are of record in the file of this patent:

UNITED STATES PATENTS

| Number | Name | Date |
| --- | --- | --- |
| 2,287,745 | Morawetz | June 23, 1942 |